(12) United States Patent
Previdi et al.

(10) Patent No.: US 7,573,888 B2
(45) Date of Patent: Aug. 11, 2009

(54) MULTICAST ROUTING OVER UNIDIRECTIONAL LINKS

(75) Inventors: Stefano Previdi, Rome (IT); Dino Farinacci, San Jose, CA (US); Ijsbrand Wijnands, Leuven (BE)

(73) Assignee: Cisco Technology, Inc., San Jose, CA (US)

( * ) Notice: Subject to any disclaimer, the term of this patent is extended or adjusted under 35 U.S.C. 154(b) by 683 days.

(21) Appl. No.: 11/118,533

(22) Filed: Apr. 29, 2005

(65) Prior Publication Data

US 2006/0221861 A1 Oct. 5, 2006

Related U.S. Application Data

(63) Continuation of application No. 11/099,245, filed on Apr. 5, 2005.

(51) Int. Cl.
H04L 12/28 (2006.01)
(52) U.S. Cl. .................................. 370/395.31; 370/312
(58) Field of Classification Search ................. 370/312, 370/389, 390, 432, 392, 397, 395.3, 395.31
See application file for complete search history.

(56) References Cited

U.S. PATENT DOCUMENTS

| 6,182,147 | B1 | 1/2001 | Farinacci | 709/238 |
|---|---|---|---|---|
| 6,301,223 | B1 * | 10/2001 | Hrastar et al. | 370/227 |
| 6,389,453 | B1 * | 5/2002 | Willis | 709/204 |
| 6,845,091 | B2 * | 1/2005 | Ogier et al. | 370/338 |
| 6,917,983 | B1 * | 7/2005 | Li | 709/238 |
| 2001/0025377 | A1 * | 9/2001 | Hinderks | 725/109 |
| 2001/0040895 | A1 | 11/2001 | Templin | 370/466 |
| 2004/0246939 | A1 * | 12/2004 | Koskiahde et al. | 370/351 |

OTHER PUBLICATIONS

Duros et al. "A Link-Layer Tunneling Mechanism for Unidirectional Links", Request for Comments 3077 (Internet Version), Network Working Group, Mar. 2001, [p. 1]-[p. 25].*
E. Duros, et al., Network Working Group Request for Comments 3077, "A Link-Layer Tunneling Mechanism for Unidirectional Links," Mar. 2001, pp. 1-24, ftp://ftp.ietf.org/rfc/rfc3077.txt.
D. Estrin, et al., Network Working Group Request for Comments 2362, "Protocol Independent Multicast-Sparse Mode (PIM-SM): Protocol Specification," Jun. 1998, pp. 1-62, ftp://ftp.isi.edu./in-notes/rfc2362.txt.
Cisco Systems, Inc., "Unidirectional Link Routing for Unicast and Multicast Environments," Jan. 16, 2003, pp. 1-18, www.cisco.com/univercd/cc/td/doc/product/software/ios120/120newft/120t/120t3/igmpudlr.htm.
Topology Dissemination Based on Reverse Path Forwarding (TBRPF), RFC 3684, SRI International, Feb. 2004, pp. 19-20.

* cited by examiner

*Primary Examiner*—Kwang B Yao
*Assistant Examiner*—Andrew Lai
(74) *Attorney, Agent, or Firm*—Campbell Stephenson LLP

(57) ABSTRACT

Various systems and methods are disclosed for performing multicast routing over unidirectional links. For example, one method involves maintaining a multicast adjacency state, which is associated with an interface that is coupled to receive messages from a network device via a unidirectional link. The multicast adjacency state identifies a network address of the network device. The method also involves sending a multicast protocol control message to the network device via a bidirectional path. The destination address of the network multicast protocol control message is the network address in the multicast adjacency state.

7 Claims, 9 Drawing Sheets

MULTICAST ROUTING OVER UNIDIRECTIONAL LINKS

CROSS-REFERENCE TO RELATED APPLICATIONS

This application is a continuation of U.S. patent application Ser. No. 11/099,245, entitled "Multicast Routing Over Unidirectional Links," filed Apr. 5, 2005, and naming Stefano Previdi, Dino Farinacci and Ijsbrand Wijnands as inventors.

FIELD OF THE INVENTION

This invention relates to networking and, more particularly, to multicast routing protocols.

DESCRIPTION OF THE RELATED ART

Networks often include unidirectional links, such as those provided by satellite connections. Unidirectional links allow traffic to be sent in only one direction, from the one or more sources to one or more receivers. Often, unidirectional links are desirable in situations that involve transmitting unacknowledged unidirectional high-volume traffic (e.g., an on-demand video stream). When such traffic is transmitted over a high-capacity full-duplex bidirectional link, the reverse-direction link is only used to carry the few acknowledgements (if any) from a receiver back to a source. Thus, nearly half of the capacity of a bidirectional link is wasted when used to transmit a mostly unacknowledged unidirectional traffic stream. Thus, in such situations, use of unidirectional links is likely to be more efficient than use of bidirectional links.

While the use of unidirectional links provides several advantages, the introduction of unicast links into a network may also cause problems with certain routing protocols. Multicast protocols such as the protocol independent multicast (PIM) protocol typically leverage off of a unicast routing protocol for various routing information. For example, PIM, which is "protocol independent" by virtue of being able to use routing information generated by any of a variety of different unicast routing protocols, uses a routing table generated by a unicast routing protocol to identify reverse path forwarding (RPF) adjacencies. RPF adjacencies exist between RPF neighbors, which are two network devices that are directly coupled to each other. One network device is the RPF neighbor of another device if that network device can send messages directly to the other network device.

PIM relies on the use of PIM hello messages to establish RPF adjacencies. When a network device receives a PIM hello message from a directly-connected neighbor, the network device identifies that the neighbor is an RPF neighbor. PIM specifies that certain PIM control messages, such as PIM joins and PIM prunes, can only be sent to RPF neighbors.

Unidirectional links allow traffic to be sent in one direction only. Accordingly, there is no way for any routing protocol to establish adjacencies over such links because routing protocols expect to send and receive traffic through the same interface. Therefore, PIM cannot establish regular adjacencies over unidirectional links.

Uni-directional link routing, or UDLR, is a technique that allows routing protocols such as PIM to operate in networks that include unidirectional links. For each unidirectional link in the network, UDLR creates a generic routing encapsulation (GRE) tunnel. The GRE tunnel serves as a "back channel" for the unidirectional link, thus transparently emulating a single bidirectional link in place of the unidirectional link. UDLR intercepts messages that need to be sent on receive-only interfaces and sends them on the UDLR back-channel tunnels. When network devices receive messages that have been sent over UDLR back-channel tunnels, UDLR de-encapsulates the messages, such that it appears as if the messages were received on send-only interfaces.

Often, implementations that depend upon GRE tunnels do not scale well. Also, when UDLR is deployed, routing protocols use the combination of the unidirectional link and the GRE tunnel return path in the same way as the routing protocols would use a true bidirectional link. This can cause several disadvantages. For example, since UDLR emulates a bidirectional link in place of a unidirectional link, multicast control traffic like PIM Join messages can be sent through the unidirectional link, causing multicast data traffic to be sent through the GRE tunnel. Behaviors such as these can exacerbate scaling and performance problems. As the above examples show, new techniques are desired for implementing multicast routing protocols in networks that include unidirectional links.

BRIEF DESCRIPTION OF THE DRAWINGS

A more complete understanding of the present invention may be acquired by referring to the following description and the accompanying drawings, in which like reference numbers indicate like features.

Figure 1:
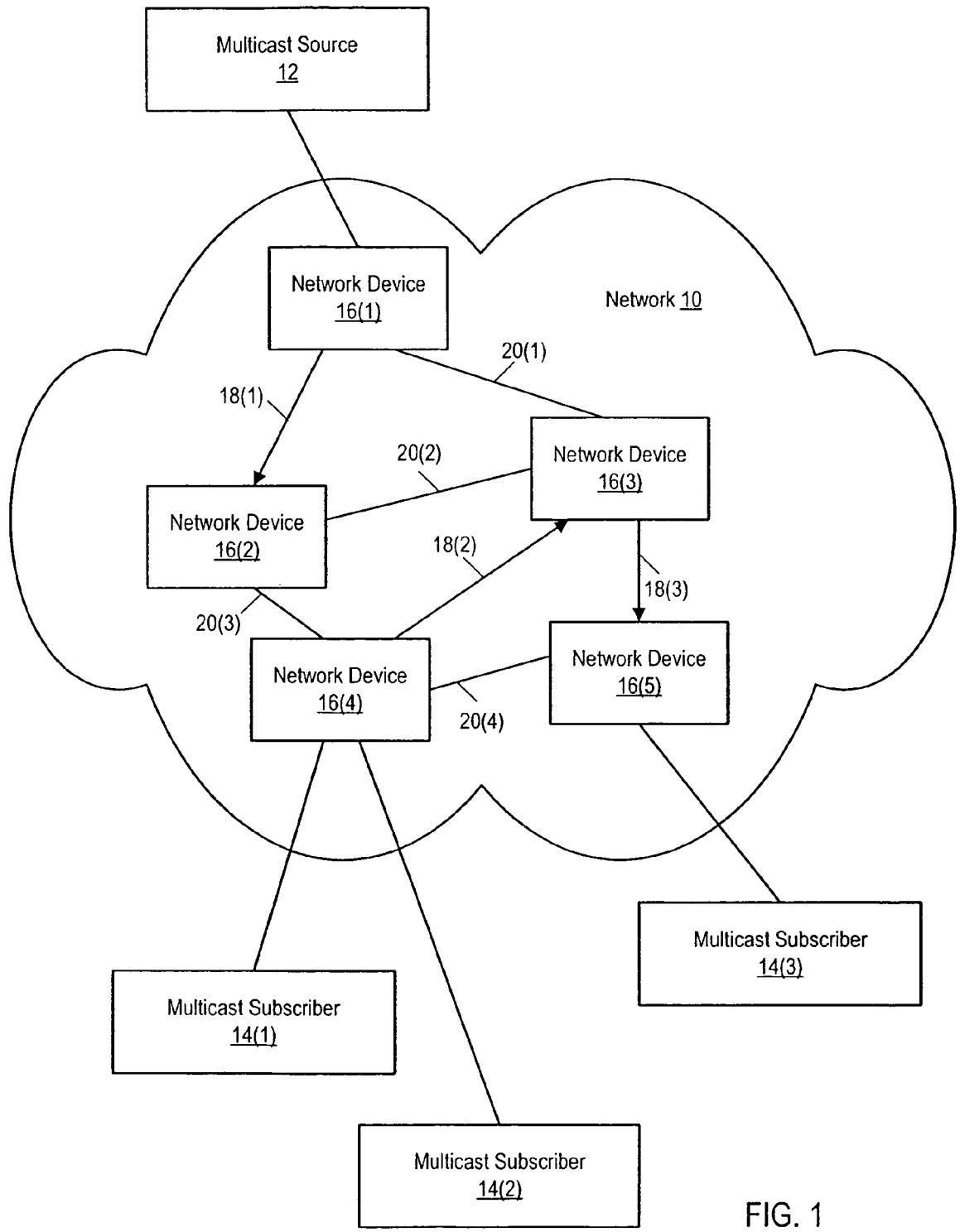
FIG. 1 shows a block diagram of a network that includes several unidirectional links, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 illustrates a network that includes several unidirectional links. As shown, a network 10 couples a multicast source 12 to several multicast subscribers 14(1)-14(3). Network 10 can include one or more local area networks (LANs) and/or wide area networks (WANs). Network 10 can be implemented using any (or a combination) of a variety of different media, including wireless links, satellite links, coaxial cables, fiber optic cables, and the like. Network 10 includes several network devices 16(1)-16(5).

As shown in FIG. 1, multicast source 12 is coupled to network device 16(1). Network device 16(1) is coupled to send messages to network device 16(2) by a unidirectional link 18(1) (the unidirectional nature of link 18(1) is indicated by the arrow pointing towards network device 16(2)). Network device 16(1) is also coupled to network device 16(3) by a bidirectional link 20(1). Network device 16(2) is coupled to network device 16(3) by a bidirectional link 20(2), and to network device 16(4) by a bidirectional link 20(3). Network device 16(4) is coupled to send messages to network device 16(3) by a unidirectional link 18(2). Network device 16(4) is also coupled to network device 16(5) by a bidirectional link 20(4). Network device 16(3) is coupled to send messages to network device 16(5) by a unidirectional link 18(3).

Multicast subscribers 14(1) and 14(2) are coupled to network device 16(4). Multicast subscriber 14(3) is coupled to network device 16(5). It is noted that one device can be coupled to another device either directly by a physical link (as shown in FIG. 1) or indirectly by, for example, a logical tunnel or several physical links and intervening network devices.

Multicast source 12 is configured to send one or more data streams to a multicast group address G. Multicast source 12 is a computing device (e.g., a host computer system, personal digital assistant, cell phone, network appliance, network device, or the like) that encodes a data stream for transmission via network 10 and then sends messages containing the encoded data stream to subscribers via network 10. For example, multicast sources 12(1) and 12(2) can be video head ends that receive the same video stream, prepare that video stream for transmission, and send messages that encode the video stream to subscribers via network 10. While FIG. 1 illustrates a single multicast source, it is noted that other embodiments can include multiple multicast sources that provide the same and/or different streams of data to the same and/or different multicast addresses. Additionally, a single multicast source can source several different streams of data to the same and/or different multicast addresses.

Multicast subscribers 14(1)-14(3) are computing devices that subscribe to a multicast group G (e.g., by sending an Internet Group Management Protocol (IGMP) group report to a network device, which causes the network device to generate a multicast group join according to, for example, Protocol Independent Multicast (PIM) Source Specific Multicast (SSM) protocol). Multicast subscribers 14(1)-14(3) then receive a data stream addressed to multicast group G via network 10, decode the data stream, and present the decoded data stream to users (e.g., via a display device such as a monitor and/or an audio device such as a speaker). Multicast subscribers 14(1)-14(3) can be personal computers, personal digital assistants, cell phones, network appliances, set top boxes, and the like.

Network devices 16(1)-16(5) (collectively, network devices 16) include various network devices (e.g., routers and/or switches) that perform routing functions and support a routing protocol. Each network device 16(1)-16(5) maintains one or more routing tables that stores routing information identifying routes to various data sources and/or data consumers.

A path is a logical or physical communications pathway via which messages can be sent to a particular device. A path can include one or more physical or logical network links, as well as one or more network devices coupled to such network links.

For purposes of this disclosure, a "message" may include a cell, datagram, frame, packet, segment, or any other logical group of information that is conveyed via a network. Network devices perform switching and routing functions in order to convey messages from a source to a destination along a path.

Each pair of network devices coupled by a unidirectional link is also coupled by a bidirectional path that includes one or more links and/or intervening network devices. For example, network devices 16(1) and 16(2) are coupled by an alternative bidirectional path that includes links 20(1) and 20(2) as well as network device 16(3). Similarly, network devices 16(3) and 16(4) are coupled by an alternative bidirectional path that includes links 20(3) and 20(2) and network device 16(2). Network devices 16(3) and 16(5) are coupled by an alternative bidirectional path that includes links 20(2), 20(3), and 20(4) as well as network devices 16(2) and 16(4).

A network device that is connected to the transmitter side of a unidirectional link is referred to herein as a send-only device, with respect to that unidirectional link. Similarly, the network device connected to the receiver side of the unidirectional link is referred to herein as a receive-only network device with respect to that unidirectional link. Thus, network device 16(1) is a send-only device with respect to unidirectional link 18(1), and network device 16(2) is a receive-only device with respect to unidirectional link 18(1).

Figure 2:
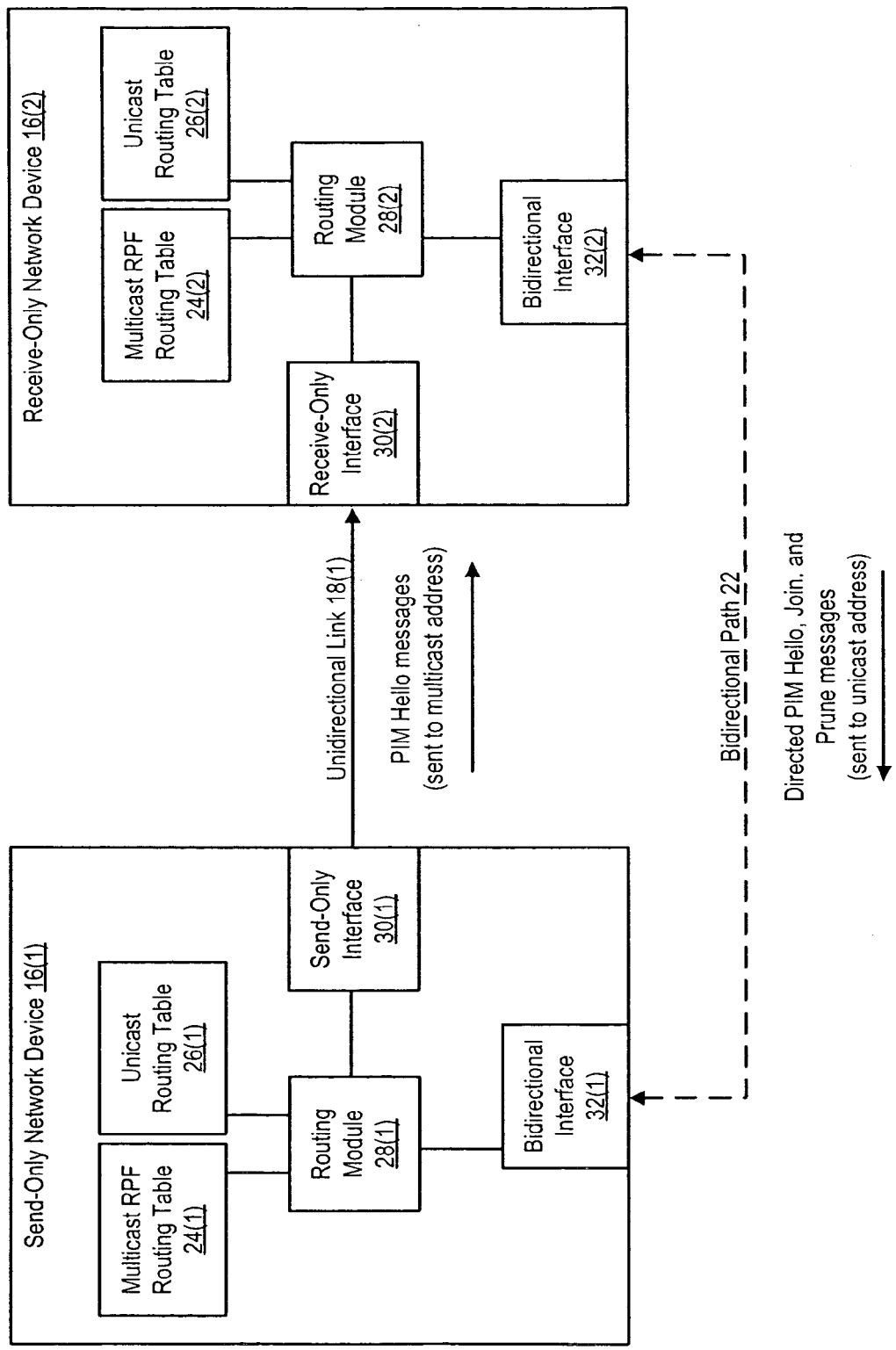
FIG. 2 is a block diagram of two network devices that are coupled by a unidirectional link, according to one embodiment of the present invention.

FIG. 2 shows a block diagram of two network devices that are coupled by a unidirectional link. As shown, network device 16(1) is coupled to network device 16(2) by unidirectional link 18(1) (e.g., as shown previously in FIG. 1). Network devices 16(1) and 16(2) are also coupled by a bidirectional path 22, which can include one or more network links and/or network devices.

Since unidirectional link 18(1) only conveys messages from network device 16(1) to network device 16(2), network device 16(1) is referred to as send-only network device 16(1) and network device 16(2) is referred to as receive-only network device.

Send-only network device 16(1) includes a multicast RPF routing table 24(1), a unicast routing table 26(1), a routing module 28(1), a send-only interface 30(1), and a bidirectional interface 32(1). Similarly, receive-only network device 16(2) includes a multicast RPF routing table 24(2), a unicast routing table 26(2), a routing module 28(2), a receive-only interface 30(2), and a bidirectional interface 32(2).

Send-only interface 30(1) is coupled to send messages on unidirectional link 18(1). Receive-only interface 30(2) is coupled to receive messages from unidirectional link 18(1). Send-only interface 30(1) cannot receive messages via unidirectional link 18(1), nor can receive-only interface 30(2) send messages via unidirectional link 18(1). In contrast, bidirectional interfaces 32(1) and 32(2) can both send and receive messages via bidirectional path 22. It is noted that each network device 16(1) and 16(2) may include additional interfaces, and that each interface can be a logical or physical interface.

Routing module 28(1) is configured to perform multicast and unicast routing based on the information in multicast RPF routing table 24(1) and unicast routing table 26(1) respectively. Similarly, routing module 28(2) performs multicast and unicast routing based on the information maintained in multicast RPF routing table 24(2) and unicast routing table 26(2), respectively. Routing modules 28(1) and 28(2) can each implement one or more instances of a unicast routing protocol and one or more instances of a multicast routing protocol.

Each network device 16(1) and 16(2) maintains a multicast RPF routing table 24(1) or 24(2) and a unicast routing table 26(1) or 26(2). The information in the multicast RPF routing tables 24(1) and 24(2) is only used by a multicast routing protocol to perform RPF lookups (as opposed to also being used by a unicast routing protocol to perform unicast routing), while the information in the unicast routing table 26(1) and 26(2) is only used by a unicast routing protocol (as opposed to also being used by a multicast routing protocol to perform RPF lookups). Both types of routing table—multicast RPF and unicast—store information related to unicast routes. The information in the multicast RPF routing table is used by a multicast routing protocol to perform RPF lookups on addresses, such as the address of a multicast source or a multicast rendezvous point.

While the multicast RPF routing table and unicast routing table within each network device are shown as being logically separate in FIG. 2, it is noted that in other embodiments, the information in the multicast RPF routing table can be combined with the information in the unicast routing table within a single routing table. In such embodiments, unicast-specific and/or multicast-RPF-specific routing table entries can be identified by information included in each entry. For example, a field within each entry can identify that entry as corresponding to multicast RPF route or a unicast route.

Some multicast routing protocols, such as Distance Vector Multicast Routing Protocol (DVMRP), do not rely on a unicast routing protocol to generate a routing table. These multicast routing protocols can establish a dedicated multicast RPF routing table. Other multicast routing protocols, such as PIM, are dependent upon an underlying unicast routing protocol to set up routing tables. In embodiments employing those multicast routing protocols, a separate instance of a unicast routing protocol can be used to establish the multicast RPF routing table (that instance of the unicast routing protocol will not perform any unicast forwarding using the multicast RPF routing table). Thus, a given network device can implement a multicast routing protocol to route multicast traffic, a unicast routing protocol such as Intermediate System to Intermediate System (ISIS) to maintain a multicast RPF routing table, and a unicast routing protocol such as RIB to maintain a unicast routing table and forward unicast traffic.

Alternatively, a single routing protocol such as Multicast Border Gateway Protocol (MBGP) and Multicast-ISIS (M-ISIS) can be used to establish the information in both the unicast routing table and the multicast RPF routing table. Routing protocols such as MBGP and M-ISIS differentiate between different multicast RPF routes and unicast routes within the same table.

Each routing table stores information, which is associated with a particular route, in a routing table entry. Routing tables can include many different entries. A routing table entry includes information identifying a network address (typically, the network address of the destination of the route), an outgoing interface (abbreviated "oif"), and a metric that identifies the efficiency of the route. The efficiency of a route can be determined based on one or more of the following factors, depending upon the routing protocol: length, cost, bandwidth, delay, load, and reliability. For example, if the routing protocol measures route efficiency in terms of route length only, the metric stored in a particular routing table entry can identify the number of network hops required to reach the network address from the outgoing interface.

Other information can also be included in a routing table entry in addition to the network address, outgoing interface, and metric. For example, a routing table entry can include information identifying whether the route includes a send-only or receive-only unidirectional link as well as information identifying whether the routing table entry is maintained for unicast or multicast routing purposes.

Thus, the information stored in the multicast RPF routing tables 24(1) and 24(2) can identify whether a route includes a unidirectional link. This information can either be generated automatically (e.g., by the routing protocol that establishes the multicast RPF routing table, if the routing protocol is configured to identify unidirectional links) or manually configured by an administrator. For multicast purposes, the outgoing interface field of a routing table entry identifies the RPF interface. The information in a multicast RPF routing table entry can, in one embodiment, identify that the RPF interface is coupled to a unidirectional link. The information can also indicate whether the RPF interface is a send-only interface or a receive-only interface with respect to that unidirectional link.

When routing modules 28(1) and 28(2) receive information (either from another network device or from an administrator) that identifies that a particular route includes a unidirectional link, routing modules 28(1) and 28(2) can update the metrics associated with that route in the multicast and unicast routing tables. For example, an administrator can manually provide information identifying routes that include unidirectional links to routing modules 28(1) and 28(2). As another example, send-only network device 16(1) can send a routing advertisement, specifying the route to the network address of send-only interface 30(1), to receive-only network device 16(2) via unidirectional link 18(1). The routing advertisement can include information identifying that the route includes a send-only unidirectional link. In response to this routing advertisement, routing module 28(2) updates multicast RPF routing table 24(2) to include an entry corresponding to that route, if such an entry is not already included. The entry includes the network address (e.g., stored in the destination address field) of send-only interface 30(1) and information (e.g., stored in the outgoing interface field) identifying the RPF interface, receive-only interface 30(2), that received the routing advertisement. Because the route includes a send-only unidirectional link, and because the entry is being created for use in performing multicast RPF lookups, the metric identifies the route as a useable route, even though messages will not actually be sent from receive-only interface 30(2) on unidirectional link 18(1). In many routing protocols, an appropriate metric to identify a useable route is any non-infinite metric, where an "infinite" metric is any metric that equals or exceeds a particular value (e.g., a value of 0xFFFFFF in IS-IS identifies a link and/or adjacency that is not to be used in routing calculation algorithm).

Similarly, in response to the routing advertisement from send-only network device 16(1), routing module 28(2) updates unicast routing table 24(2) to include an entry corresponding to the advertised route, if such an entry does not already exist. As with the entry in multicast RPF routing table 24(2), this entry will include the network address of send-only interface 30(1) (e.g., in the destination address field) and information identifying receive-only interface 30(2) (e.g., in the outgoing interface field). In response to the information identifying that the route includes a send-only unidirectional link, however, routing module 28(2) will store an infinite metric for the route in the entry in unicast routing table 26(2). This prevents any unicast traffic from being routed to receive-only interface 30(2) for transmission over unidirectional link 18(1). Thus, by separating the routing table information used for unicast routing from the routing table information used for multicast RPF lookups, different metrics can be associated with the same route in different routing tables.

Send-only network device 16(1) can also maintain different metrics for the route leading to the network address of receive-only interface 30(2). Routing table entries for this route in multicast RPF routing table 24(1) and unicast routing table 26(1) will identify the network address of receive-only interface 30(2) (e.g., in the destination address field) as well as information identifying send-only interface 30(1) (e.g., in the outgoing interface field). Since this route includes send-only (from the perspective of send-only network device 16(1)) unidirectional link 18(1), the metric associated with the route in multicast RPF routing table 24(1) will be infinite, indicating that the route is not efficient enough to be useable. Thus, when an RPF lookup is performed for the network address associated with receive-only interface 30(2), the RPF lookup will not identify send-only interface 30(1) as an appropriate interface to use to send messages to that network address. This prevents multicast join and prune messages from being sent via the unidirectional link, which in turn ensures proper behavior by preventing send-only network device 16(1) from requesting to receive a multicast stream via unidirectional link 18(1). In contrast, the metric associated with the route in unicast routing table 26(1) will be a finite metric, allowing unicast traffic to be sent to receive-only network device 16(2) via unidirectional link 18(1).

Since multicast RPF routing information for an interface coupled to a unidirectional link is maintained separately from the unicast routing information that corresponds to the same unidirectional link, the network devices connected to the unidirectional link can configure different metric values for unicast routing information than for multicast RPF routing information. Because multicast RPF routing table 24(2) identifies a route that includes a receive-only unidirectional link as having a finite metric, routing module 28(2) in receive-only network device 16(2) can compute a shortest path tree for multicast purposes that includes the unidirectional link in the tree's Receiver-to-Sender direction, even though this direction is never actually used to forward multicast control messages (e.g., such as join messages). In contrast, in the multicast shortest path tree computed by routing module 28(1) in send-only network device 16(1), a route that includes a send-only unidirectional link is not be considered at all, since that route is associated with an infinite metric in multicast RPF routing table 24(1).

Normally, when directly coupled by a bidirectional link, network devices that support a multicast routing protocol exchange some sort of status message (e.g., a heartbeat or hello message) with each other. The exchange of these messages allows each network device to identify whether the neighboring network device is multicast capable and to establish RPF adjacencies (if appropriate) with each other. For example, in PIM, Hello messages are sent periodically between PIM neighbors, every few seconds. Receipt of Hello messages informs network devices about which interfaces have PIM neighbors. Hello messages are sent on all types of communication links, regardless of the metric associated with each link in the multicast RPF routing table. When a network device receives a Hello message, the network device stores the address of the network device that sent the Hello message.

When network devices are directly coupled by a unidirectional link, status messages can only be exchanged in one direction via the unidirectional link. As shown in FIG. 2, in order to exchange status messages, send-only network device 16(1) sends "Hello" messages via the unidirectional link 18(1). The Hello messages are sent to a multicast destination address that represents the group of multicast-capable network devices. Receive-only network device 16(2) is a subscriber to that multicast group.

Since messages cannot be returned via unidirectional link, receive-only network device 16(2) sends Hello message responses (and other multicast control messages, such as Join and Prune messages) to send-only network device 16(2) via bidirectional path 22. For this same reason, send-only network device 16(1) does not send Join and Prune messages to receive-only network device 16(2) via unidirectional link 18(1), since receive-only network device 16(2) is unable to send a multicast data stream to send-only network device 16(1).

The Hello messages that receive-only network device 16(2) sends to send-only network device 16(2) are sent to a unicast destination address, instead of the multicast destination address associated with multicast-capable network devices. These Hello messages are sent as normal unicast L3 (e.g., Internet Protocol) messages, and thus are not dropped by any intervening network devices included in bidirectional path 22. The Hello messages sent by receive-only network device 16(2) are not conveyed on unidirectional link 18(1).

The unicast destination address that should be used to send Hello messages to send-only network device 16(1) is provided to receive-only network device 16(2) by send-only network device 16(1). The unicast destination address is reachable via bidirectional path 22. In one embodiment, send-only network device 16(1) provides the address to receive-only network device 16(2) within the Hello message. For example, send-only network device 16(1) can include the unicast address as the source address of the Hello message (e.g., instead of using the address of send-only interface 30(1) as the source address, send-only network device 16(1) can use another unicast address as the source address of the Hello message). Alternatively, send-only network device 16(1) can insert an extra field (e.g., an additional type-length-value (TLV) field) into the Hello message, and the unicast address can be included in that extra field.

When receive-only network device 16(2) receives a Hello message via receive-only interface 30(2), routing module 28(2) can identify that the Hello message was received via a unidirectional link (e.g., based on information in multicast RPF routing table 24(1) that identifies that receive-only interface 30(2) is coupled to a unidirectional link). In response to detecting that the Hello message was received via a unidirectional link, routing module 28(2) can extract the unicast address from the Hello message. Routing module 28(2) then stores information associating the unicast address with receive-only interface 30(2). Routing module 28(2) will use this information to address multicast protocol control messages (e.g., Hello messages, join messages, and prune messages) that are sent to send-only network device 16(1) from receive-only interface 30(2).

In one embodiment, send-only network device 16(1) sends, via unidirectional link 18(2), Hello messages that use the loopback address of send-only network device 16(1) as the source address and the multicast address for multicast network devices as the destination address. Receive-only network device 16(2) receives the Hello message via receive-only interface 30(2), extracts the loopback address from the source address field of the Hello message, and stores the loopback address for later use. The loopback address is an address that is associated with send-only network device 16(1) that is always reachable via a bidirectional link. For example, the loopback address can be the address of a virtual "loopback" interface of send-only network device 16(1). Often, loopback interfaces have no associated hardware and are not physically connected to a network. Loopback interfaces are often used to test IP software independently of underlying hardware problems or constraints. It is noted that other addresses that are associated with send-only network device 16(1) and reachable via a bidirectional path can be used instead of the loopback address (e.g., if a loopback address is not available).

In response to receiving a Hello message via unidirectional link 18(1), receive-only network device 16(2) sends a Hello message via bidirectional path 22. The Hello message sent by receive-only network device 16(2) has as its source address the address of receive-only interface 30(2). The destination address of the Hello message sent by the receive-only network device is the address provided by the send-only network device within the Hello message sent from send-only network device 16(1) to receive-only network device 16(2).

Some multicast protocols, such as PIM, require Hello messages to be exchanged between directly connected neighbors. If send-only network device 16(1) sends Hello messages that use a source address on a different subnet than the source address used in Hello messages sent by receive-only network device 16(2), this requirement is not met. However, when send-only network device 16(1) receives Hello messages, routing module 28(1) checks in a routing protocol database to determine whether the Hello message effectively originated at a directly connected neighbor. This determination is made by identifying the source address of the Hello message and verifying (e.g., by accessing a routing protocol database) that the source address belongs to a subnet originated by a directly connected neighbor.

As a second alternative, instead of using a loopback address as the source address of Hello messages, send-only network device 16(1) includes the loopback address in an extra field within the body of the Hello message. Thus, the Hello message will include the address of send-only interface 30(1) as the source address, the multicast address identifying multicast capable network devices as the destination address, and the loopback address included in a field within the body of the Hello message. When the receive-only network device receives the Hello message, receive-only network device 16(2) extracts the value of the field that contains the loopback address. The content of this field informs receive-only network device 16(2) which address to use as a destination address when sending Hello messages towards send-only network device 16(1). As in the previous example, routing module 28(2) can then store information associating receive-only interface 30(2) with the network address extracted from the field within the body of the Hello message. Routing module 28(2) will use this information to address multicast protocol control messages (e.g., Hello messages, join messages, and prune messages) that are sent to send-only network device 16(1) from receive-only interface 30(2). Since the network address is used as the source address of Hello messages sent from send-only network device 16(1) to receive-only network device 16(2) via unidirectional link 18(1), receive-only network device will identify that send-only network device is a multicast-capable neighbor within the same subnet as receive-only interface 30(2).

As yet another alternative, send-only network device 16(1) can inform receive-only network device 16(2) of a unicast address, reachable via a bidirectional path, by sending a host route advertisement, which identifies a host route to the unicast address, from bidirectional interface 32(1) on bidirectional path 22. For example, in one embodiment, send-only network device 16(1) can use the address of send-only interface 30(1) as the source address in Hello messages. Send-only network device can also advertise a host route to that address via bidirectional interface 32(1). When receive-only network device 16(2) receives the route advertisement via bidirectional interface, routing module 28(2) will associate the unicast address with bidirectional interface 32(1) as well as with an appropriate metric indicating the efficiency of the route to that unicast address. Routing module 28(2) can store a routing table entry corresponding to the route in unicast routing table 26(2).

When send-only network device 16(1) sends a Hello message via unidirectional link 18(1), the source address of the Hello message will be the network address of send-only interface 30(1). The destination address of the Hello message sent by the send-only network device over the unidirectional link is the multicast address that identifies the group of multicast-capable network devices. When receive-only network device 16(2) generates a responsive unicast Hello message to be sent back to send-only network device 16(1), the destination address of the responsive Hello message will be the network address of send-only interface 30(1). This Hello message will be sent unicast from bidirectional interface 32(2) on bidirectional path 22, in response to the routing table entry in unicast routing table 26(2).

In addition to sending Hello messages to a unicast destination address provided by send-only network device 16(1), receive-only network device 16(2) can also send other types of multicast protocol control messages to the unicast destination address. For example, if a multicast forwarding state maintained by receive-only network device 16(2) indicates that receive-only interface 30(2) is the incoming interface (abbreviated "iif") for a particular multicast group, routing module 28(2) can cause a multicast join message specifying that multicast group to be sent to send-only network device 16(1). Routing module 28(2) can access the stored information associating receive-only interface with the unicast destination address and, based on that stored information, set the destination address of the multicast join message to the unicast destination address. The source address of the multicast join message is the network address of receive-only interface 30(2). The multicast join message can then be sent to send-only network device 16(1) via bidirectional path 22.

In response to receiving the join message, routing module 28(1) of send-only network device 16(1) accesses an adjacency database to determine, based on the join message's source and destination addresses, whether the join message is received from a multicast capable neighbor. The information in the adjacency database also identifies that send-only interface 30(1) is used to send messages to receive-only network device 16(2). Accordingly, based on this information, send-only network device 16(1) can add send-only interface 30(2) to the list of outgoing interfaces (oifs) included in a multicast forwarding state maintained for the multicast group specified in the multicast join message.

In some embodiments, send-only network device 16(1) maintains an adjacency database that stores information describing each of the send-only network device's neighbors. This information can include information such as a flag specifying whether a given neighbor is a receive-only network device and, if so, the address that the send-only network device should advertise (e.g., within Hello messages) to that neighbor.

Figure 3:
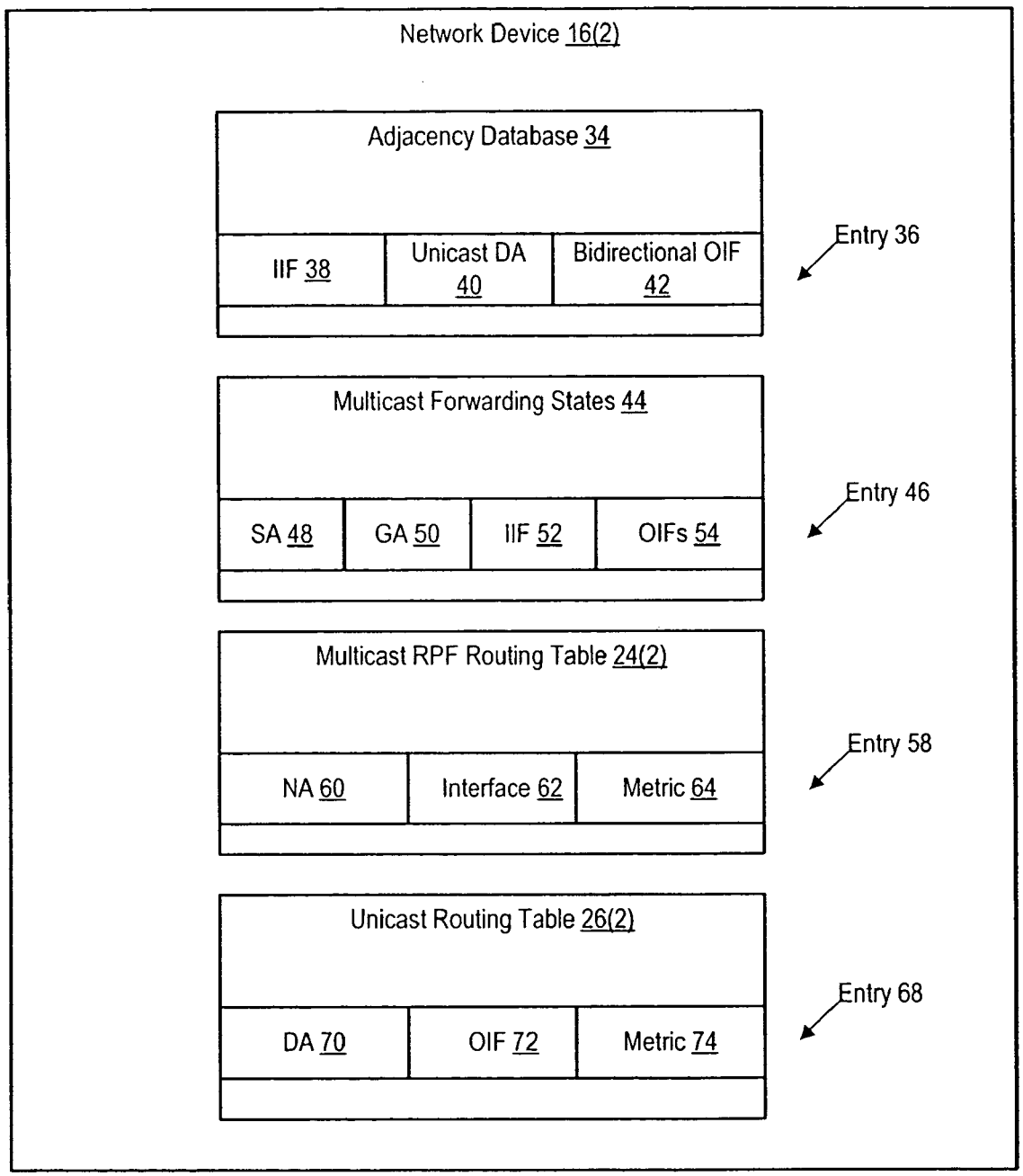
FIG. 3 shows a block diagram of information maintained a network device that performs multicast routing over a unidirectional link, according to one embodiment of the present invention.

FIG. 3 is a block diagram of network device 16(2), illustrating the types of information that can be maintained by routing module 28(2) of FIG. 2. Similar information can be maintained by routing module 28(1) in network device 16(1).

As shown, network device 16(2) can maintain one or more adjacency states 34. Adjacency states 34 are maintained in embodiments in which send-only network devices provide unicast destination addresses within Hello messages. Each adjacency state can be maintained in a separate entry 36, which identifies an incoming interface (abbreviated "IIF") 38, a unicast destination address (abbreviated "DA"), and a bidirectional outgoing interface (abbreviated "OIF"). An adjacency state entry can be created in response to receiving a multicast Hello message via a unidirectional link. The incoming interface is the interface that received the Hello message via the unidirectional link. The unicast destination address is extracted from the Hello message (e.g., from the source address or from a field within the body of the Hello message). The bidirectional outgoing interface is an interface that can send messages to the unicast destination address via a bidirectional path. Adjacency states 34 can be used to send multicast protocol control messages (e.g., Hello, join, and prune messages) to send-only devices from receive-only devices.

In send-only devices, adjacency state entries can also be used to verify a unicast Hello message received via a bidirectional path from a receive-only network device. For example, an administrator can create an adjacency state in a send-only network device in order to associate a send-only interface with a bidirectional interface. In this situation, the unidirectional interface field identifies the send-only interface, the unicast destination address (abbreviated "DA") field identifies the address of the bidirectional interface, and the bidirectional interface field identifies the bidirectional interface. When the send-only network device receives a unicast message via the bidirectional interface, and that message is a multicast protocol control message (e.g., a Hello, join, or prune), the send-only network device can look for the bidirectional interface and destination address in the adjacency state table to identify the associated send-only interface. If a valid matching adjacency state is found, the send-only network device can then process the multicast protocol control message as if that message had been received via the send-only interface.

Network device 16(2) can also maintain multicast forwarding states 44. Each multicast forwarding state can be stored in an entry 46. An entry 46 can includes a source address 48 (abbreviated "SA;" the source address is optional in protocols such as PIM-Sparse Mode), a group address 50 (abbreviated "GA"), an incoming interface 52, and one or more outgoing interfaces (abbreviated "OIFs"). A routing module uses multicast forwarding states to store shortest path trees and when determining how to forward multicast protocol messages.

Network device 16(2) can also store multicast RPF routing table 24. Each entry 58 in multicast RPF routing table 24(2) stores information associated with a route that can be used to perform RPF lookups (e.g., when determining whether multicast protocol control messages can be sent to a particular neighbor network device). Each entry 58 identifies a network address 60, an interface 62 used to communicate with that network address, and a metric associated with the route. Each entry can also include information (not shown) identifying whether the route from the network address to the interface includes a send-only or receive-only unidirectional link.

A unicast routing table 26(2) includes one or more entries. Each entry 68 includes a destination address 70 (abbreviated "DA"), an outgoing interface 72 that can be used to send messages to the destination address, and a metric 74 identifying the efficiency of the route to the destination address via the outgoing interface.

Several examples of how the tables of FIG. 3 can be used can be provided in the context of FIG. 1. For example, multicast subscriber 14(3) can send an IGMP report specifying a particular multicast group G (e.g., using the address of that multicast group) to network device 16(5) (e.g., by sending the IGMP report on a LAN coupling multicast subscriber 14(3) to network device 16(5)). In this example, multicast source 12 sources a multicast data stream the multicast group G.

In response to the IGMP report specifying the multicast group, network device 16(5) will generate a multicast join message specifying the multicast group G. For example, if the multicast service model being used is PIM-SM, network device 16(5) can send a (*,G) join message towards the rendezvous point for multicast group G. If the multicast service model being used is PIM-SSM, network device 16(5) can send an (S,G) join message towards the source for multicast group G.

To send the join message, network device 16(5) will access multicast forwarding states 44 to see if a shortest path tree having the source or rendezvous point as its root has already been established. If a shortest path tree that corresponds to the multicast group identified in the multicast join has not already been established (e.g., as evidenced by there being no matching multicast forwarding state entry for the multicast group), network device 16(5) can build a shortest path tree by allocating a multicast forwarding state entry. The allocated entry stores information identifying the outgoing interfaces (in this situation, the interface that received the multicast join), the incoming interface (e.g., an interface associated with the multicast group address G), which is the receive-only interface coupled to unidirectional link 18(3), the group address G, and the source address, if any source address was specified in the join.

Network device 16(5) then sends the join message towards the root of the tree. Since the incoming interface for the multicast group is a receive-only interface, network device 16(5) cannot send the join via the incoming interface. Instead, network device 16(5) can access an adjacency state entry in order to identify a unicast address (e.g., field 40, as shown in FIG. 3) and bidirectional interface (e.g., stored in field 42, as shown in FIG. 3) that correspond to the receive-only interface. The adjacency state entry will identify a unicast network address of network device 16(3) that is reachable via a bidirectional path. Network device 16(5) uses the unicast address obtained from the adjacency state entry as the destination address of the join message and then sends the join message via the bidirectional interface (e.g., the interface coupled to link 20(4) of FIG. 1)).

If one of the multicast forwarding state entries corresponds to the multicast group G, network device 16(5) will add the incoming interface (the interface that received the join) to the list of outgoing interfaces. If it is desirable to continue to propagate the join up the shortest path tree (e.g., in order to refresh multicast forwarding states in intervening network devices), network device 16(5) can also use the information in the multicast forwarding state entry to determine how to send the join towards the root of the shortest path tree, as described above.

The join message sent by network device 16(5) is being sent to a unicast destination address. Accordingly, network device 16(4), which receives the join message via link 20(4), will handle the message as a normal IP message and forward the join message to network device 16(3) (e.g., via unidirectional link 18(2)).

Network device 16(3) receives the join message and uses an adjacency state to verify that the join message is received from a directly-connected neighbor. For example, network device 16(3) can maintain an adjacency state (e.g., as configured by an administrator) that is useable to identify that a multicast protocol control message having a source address identifying the receive-only interface of network device 16(5) are received from a directly-connected neighbor.

After verifying the join message, network device 16(3) will determine whether a shortest path tree has already been established for the multicast group G. If not, network device 16(3) will allocate a multicast forwarding state entry for the multicast group G. Network device 16(3) will update the multicast forwarding state entry to identify the outgoing interface associated with the join message. Normally, network device 16(3) would use an identifier corresponding to the interface via which the join message was received. In this situation, however, that interface is acting as a proxy for the send-only interface coupled to unidirectional link 18(3), since the send-only interface cannot receive messages directly. Accordingly, based on the information in the join message (e.g., the source address identifying the receive-only interface in network device 16(5)) and the corresponding adjacency state information, network device 16(3) will identify the send-only interface as the outgoing interface in the multicast forwarding state entry. Network device 16(3) then continues to propagate the join message towards multicast source 12.

As another example, consider a situation in which a message addressed to the multicast group G is being forwarded from multicast source 12 towards multicast subscriber 14(3). In this example, network device 16(1) is the root of the shortest path tree, and messages to multicast subscriber 14(3) are forwarded via network devices 16(3) and 16(5). When network device 16(1) receives the message, network device 16(1) forwards the message normally via link 20(1) using a multicast forwarding state.

Network device 16(3) receives the message and accesses a corresponding multicast forwarding state. The multicast forwarding state identifies the outgoing interfaces, including the send-only interface coupled to unidirectional link 18(3), to which the message should be sent. Based on this multicast forwarding state, network device 16(3) sends the message to network device 16(5). Network device 16(5) then forwards the message to multicast subscriber 14(3).

Figure 4:
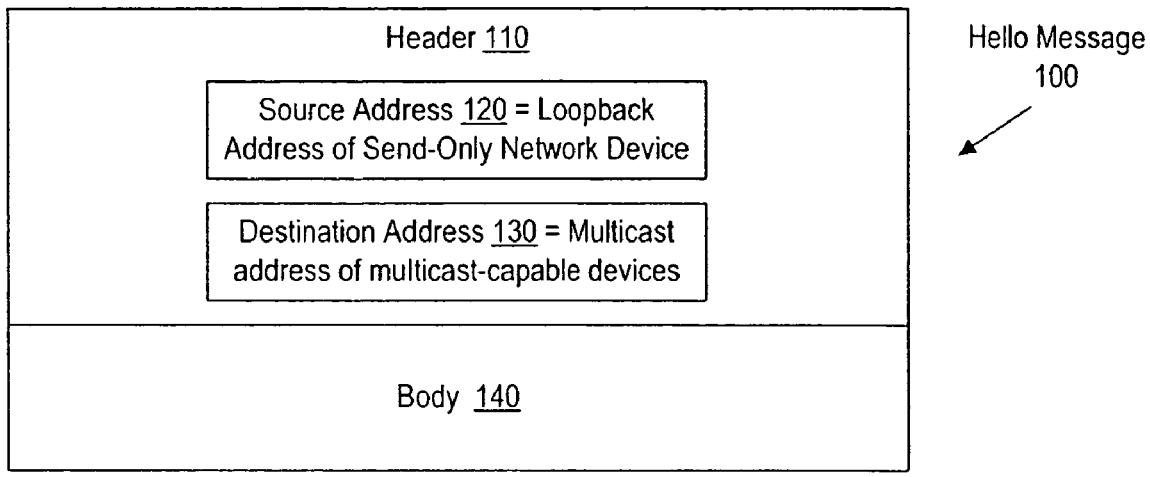
FIG. 4 is a block diagram illustrating a multicast protocol hello message, according to one embodiment of the present invention.
Figure 5:
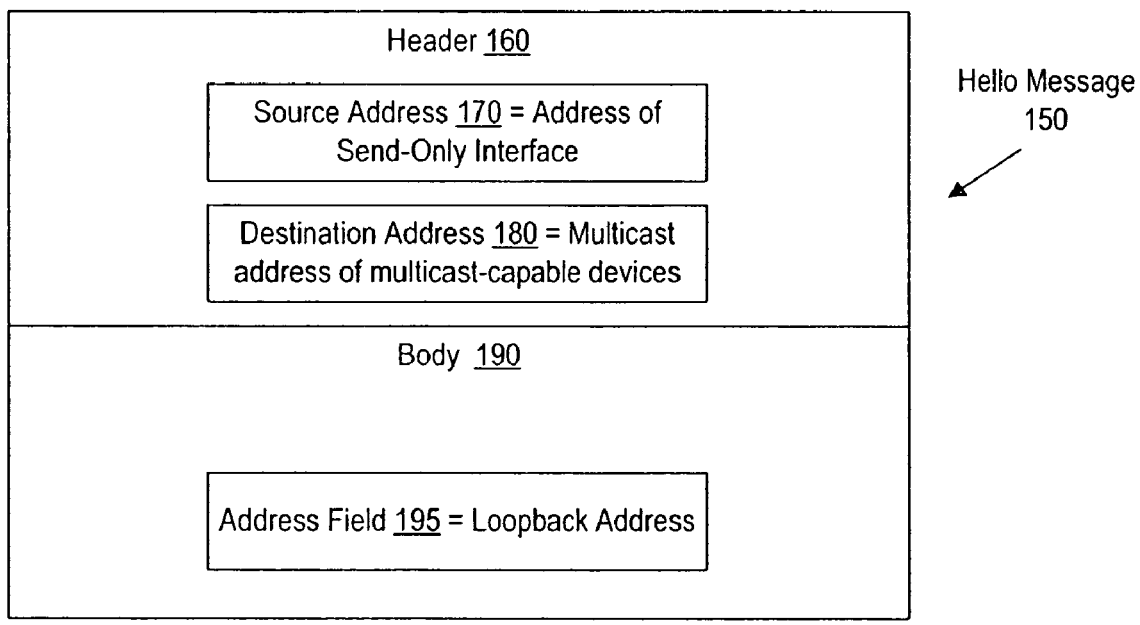
FIG. 5 is a block diagram illustrating another multicast protocol hello message, according to one embodiment of the present invention.

FIGS. 4 and 5 show different examples of Hello messages that can be sent from a send-only network device to a receive-only network device in order to provide a unicast destination address, which is reachable via a bidirectional path, to the receive-only network device. In FIG. 4, a Hello message 100 includes a header 110 and a body 140. The header includes a source address 120 and a destination address 130. Source address 120 is the loopback address (or another address that is reachable via a bidirectional path) of the send-only network device. Destination address 130 is the multicast address that identifies the group of multicast-capable network devices. In this example, source address 120 is the unicast destination address of the send-only network device that is reachable via a bidirectional path.

In FIG. 5, Hello message 150 includes a header 160 and a body 190. Header 160 includes a source address 170, which is the address of the send-only interface of the send-only device, and a destination address 180, which is the multicast address that identifies the group of multicast-capable network devices. Body 170 includes an address field 180, which includes the loopback address (or another address that is reachable via a bidirectional path) of the send-only device. Thus, in this example, the body of the Hello message is used to convey the unicast destination address of the send-only network device.

Figure 6:
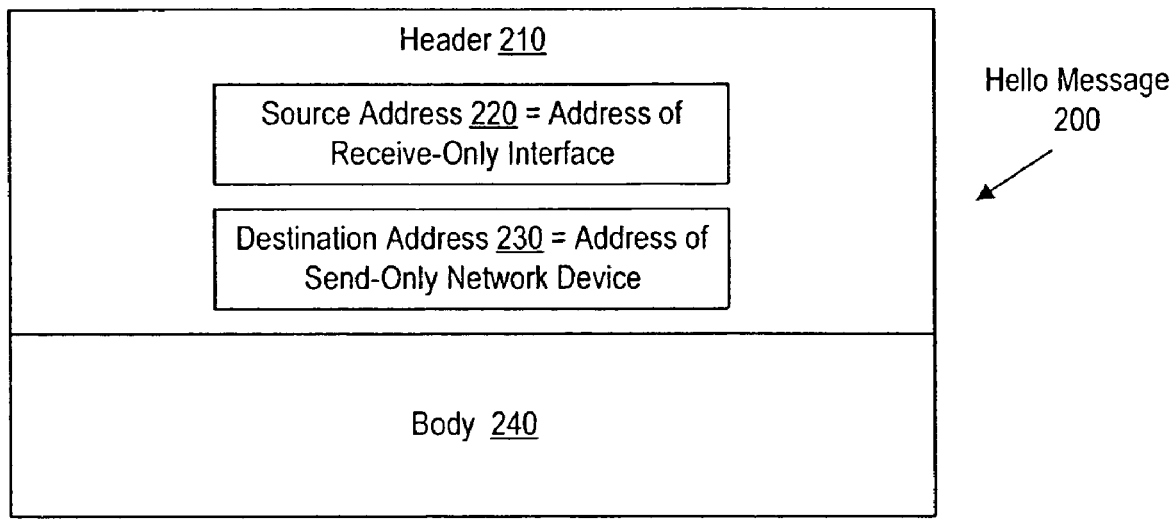
FIG. 6 is a block diagram illustrating yet another multicast protocol hello message, according to one embodiment of the present invention.

FIG. 6 shows an example of a Hello message 200 that can be sent from a receive-only network device to a send-only network device via a bidirectional path. Like the Hello messages in FIGS. 4 and 5, Hello message 200 includes a header 210 and a body 240. The header includes a source address 220 and a destination address 230. In this Hello message, source address 220 is the address of the receive-only interface. Unlike other the destination addresses of Hello messages, which specify a multicast destination address, destination address 230 of Hello message 200 is an address of the send-only network device, such as the loopback address (or another address that is reachable via a bidirectional path) of the send-only network device. Destination address 230 is obtained from an adjacency table maintained by the receive-only device.

Figure 7:
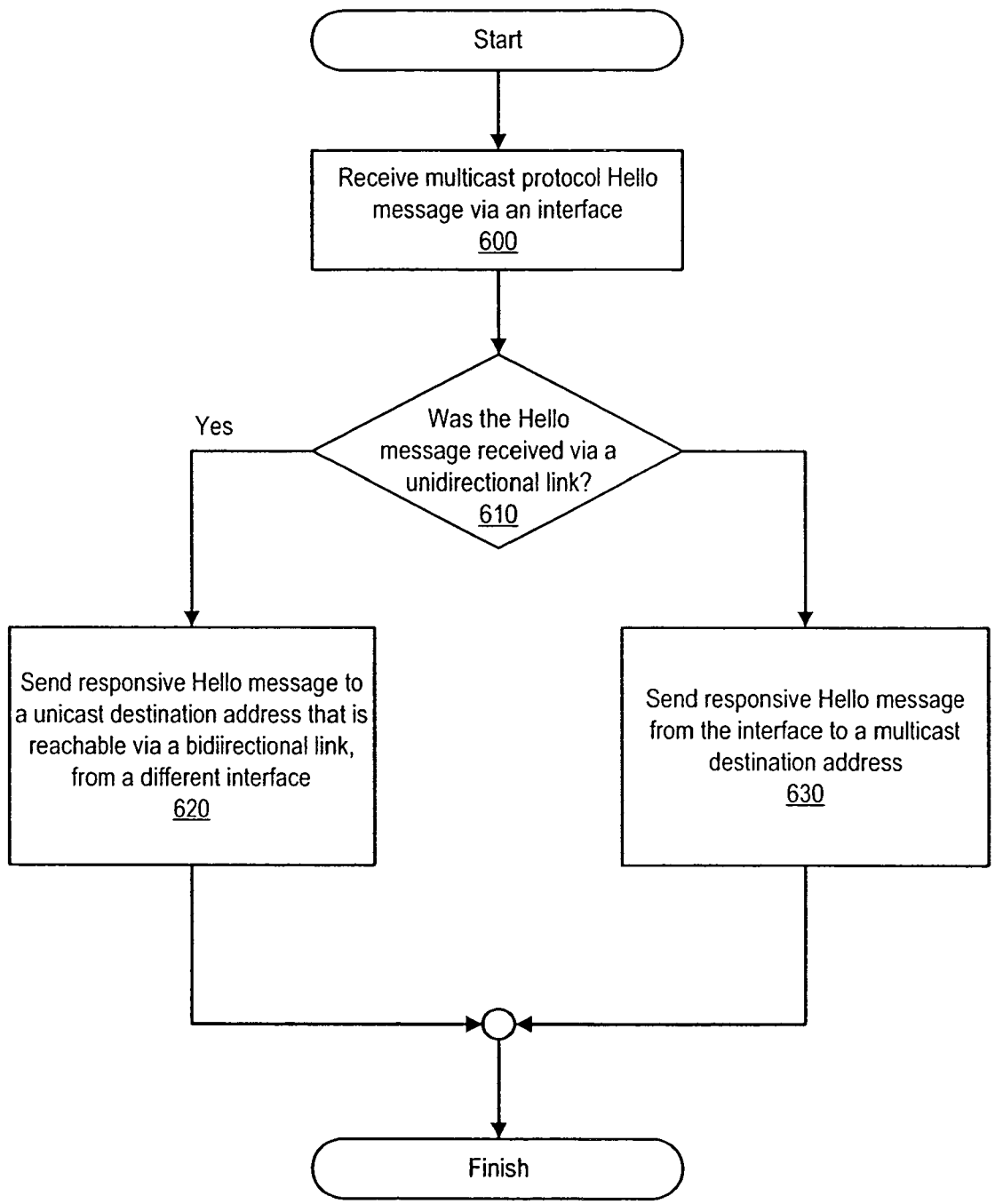
FIG. 7 is a flowchart of a method performed by a network device that receives a multicast protocol hello message, according to one embodiment of the present invention.

FIG. 7 shows an example of a method performed by a network device that receives multicast protocol hello messages, such as receive only network device 16(2) of FIG. 2. The message begins at 600, when the network device receives a multicast protocol hello message via an interface. If the multicast protocol hello message is received via a unidirectional link, as determined at 610, the network device sends a responsive hello message to a unicast destination address that is reachable via a bidirectional path, as indicated at 620. The unicast hello message is sent from a different interface than the interface that received the hello message at 600.

If the hello message is received via a bidirectional link, the network device sends a responsive hello message to a multicast destination address that identifies the group of multicast capable routers, as indicated at 630. This hello message is sent from the same interface that received the first hello message at 600.

Figure 8:
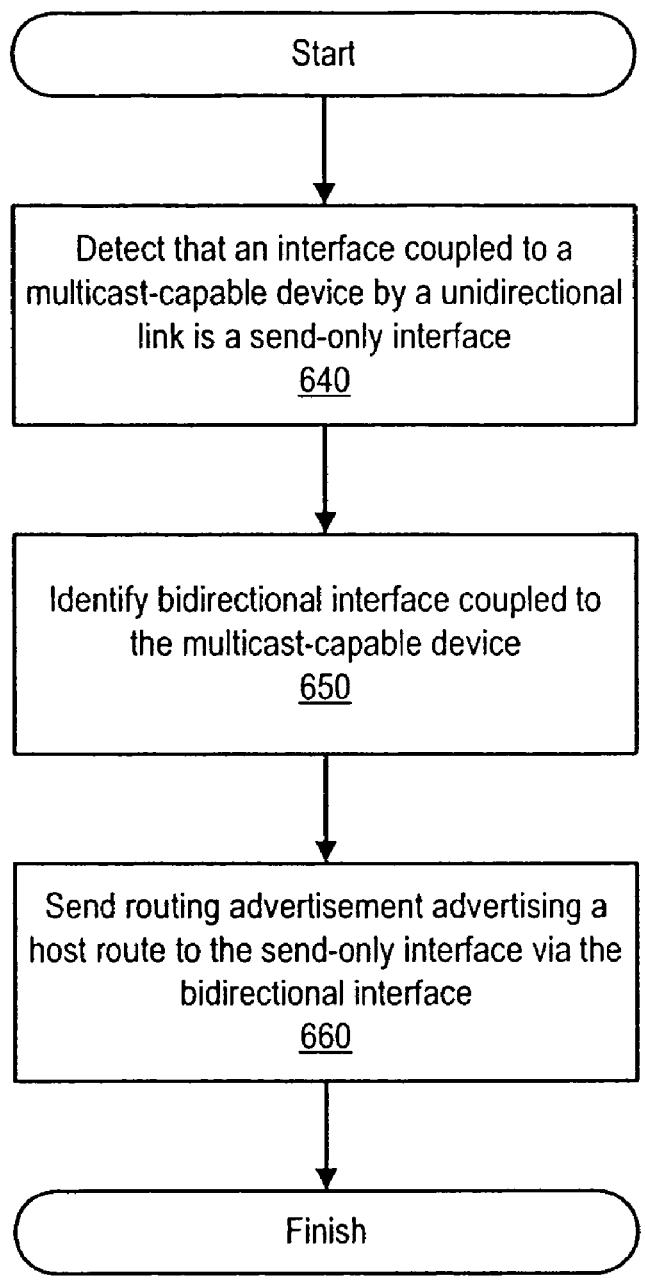
FIG. 8 is a flowchart of a method performed by a network device that advertises a host route to a send-only interface, according to one embodiment of the present invention.

FIG. 8 is a flowchart illustrating a method of advertising a host route to a send-only interface. This method can be used as by a send-only network device in order to provide a receive-only network device with information identifying a bidirectional path useable to reply to Hello messages and otherwise send multicast protocol control messages (e.g., joins and prunes) to the send-only network device.

At 640, the send-only network device detects that an interface that is coupled to a multicast-capable device by a unidirectional link is a send-only interface. For example, the send-only network device can detect this condition in response to an administrator manually providing information identifying the send-only interface to the send-only network device. Alternatively, a routing protocol can automatically provide such information to the send-only network device.

The send-only network device then identifies a bidirectional interface that is coupled to the multicast-capable device, as shown at 650. The bidirectional interface can be coupled to the multicast-capable device either directly (e.g., by a single bidirectional link) or indirectly (e.g., by several bidirectional links and/or intervening network devices). The send-only network device can identify the bidirectional interface by accessing routing information. For example, the send-only network device can access a manually configured adjacency state, which identifies the send-only interface and a corresponding bidirectional interface, that is provided by an administrator. Alternatively, the send-only network device can identify the bidirectional interface by accessing a unicast routing table entry corresponding to the multicast-capable device.

At 660, the send-only network device sends a routing advertisement, which identifies a host route to the send-only interface by way of the bidirectional interface. The send-only network device can, in some embodiments, send this routing advertisement from the bidirectional interface identified in the host route. Alternatively, the send-only network device can send the routing advertisement from another interface (e.g., the send-only interface).

Figure 9:
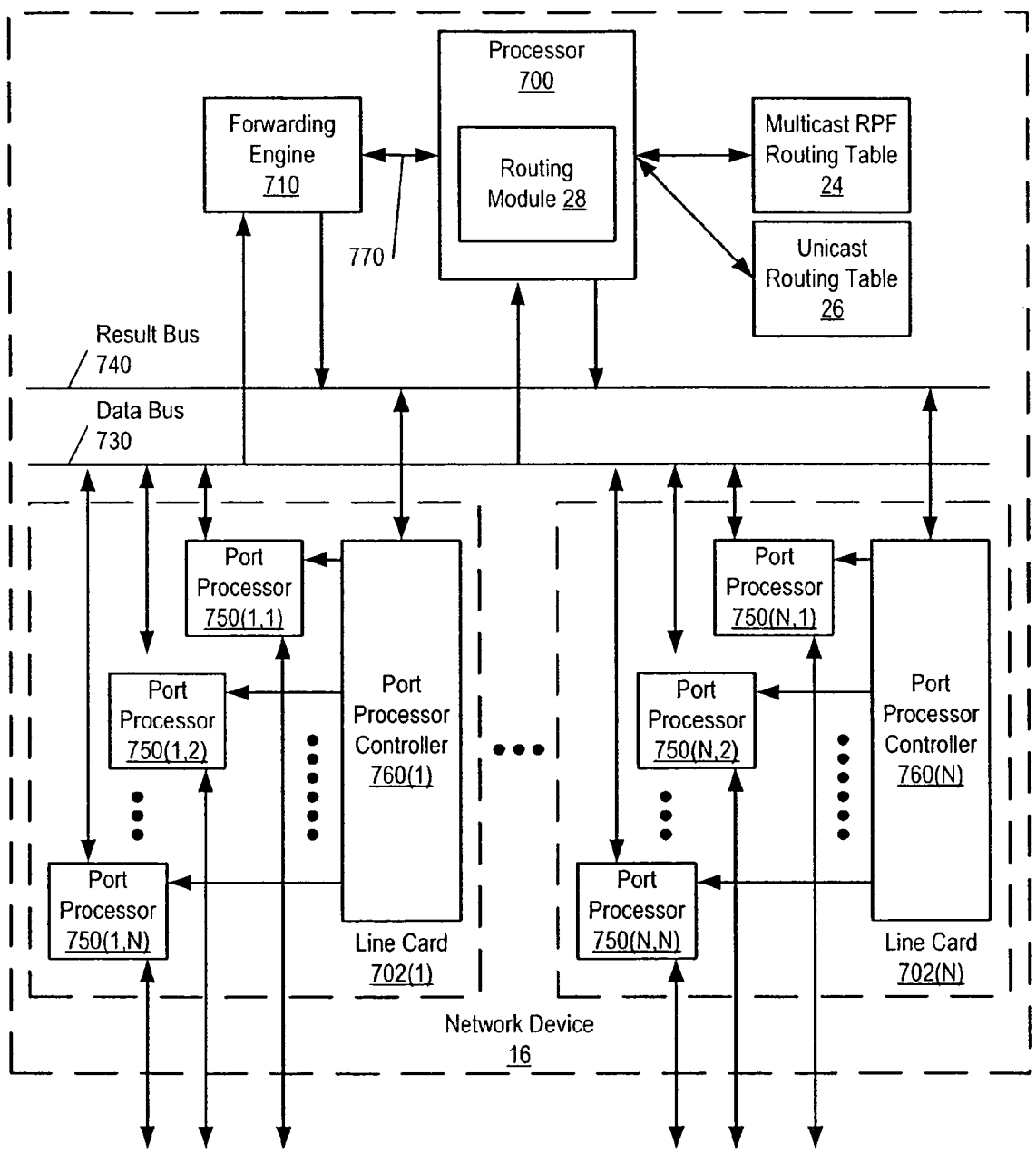
FIG. 9 is a block diagram of a network device, according to one embodiment of the present invention.

FIG. 9 is a block diagram of a network device 16 (e.g., one of network devices 16(1)-16(2) of FIG. 2). In this depiction, network device 16 includes a number of line cards (line cards 702(1)-702(N)) that are communicatively coupled to a forwarding engine 710 and a processor 700, which includes a routing module 28 (e.g., such as routing modules 28(1) and 28(2) illustrated in FIG. 2) via a data bus 730 and a result bus 740. Routing module 28 is coupled to maintain a unicast routing table 26 (e.g., one of unicast routing tables 26(1) and 26(2) of FIG. 2) and a multicast RPF routing table 24 (e.g., one of multicast RPF routing tables 24(1) and 24(2) of FIG. 2).

Line cards 702(1)-702(N) include a number of port processors 750(1,1)-750(N,N) which are controlled by port processor controllers 760(1)-760(N). It will also be noted that forwarding engine 710 and route processor 700 are not only coupled to one another via data bus 730 and result bus 740, but are also communicatively coupled to one another by a communications link 770. It is noted that in alternative embodiments, each line card can include a forwarding engine.

When a message is received, the message is identified and analyzed by a network device such as network device 16 in the following manner, according to embodiments of the present invention. Upon receipt, a message (or some or all of its control information) is sent from the one of port processors 750(1,1)-750(N,N) at which the message was received to one or more of those devices coupled to data bus 730 (e.g., others of port processors 750(1,1)-750(N,N), forwarding engine 710 and/or route processor 700). Handling of the message can be determined, for example, by forwarding engine 710. For example, forwarding engine 710 may determine that the message should be forwarded to one or more of port processors 750(1,1)-750(N,N). This can be accomplished by indicating to corresponding one(s) of port processor controllers 760(1)- 760(N) that the copy of the message held in the given one(s) of port processors 750(1,1)-750(N,N) should be forwarded to the appropriate one of port processors 750(1,1)-750(N,N).

Figure 10:
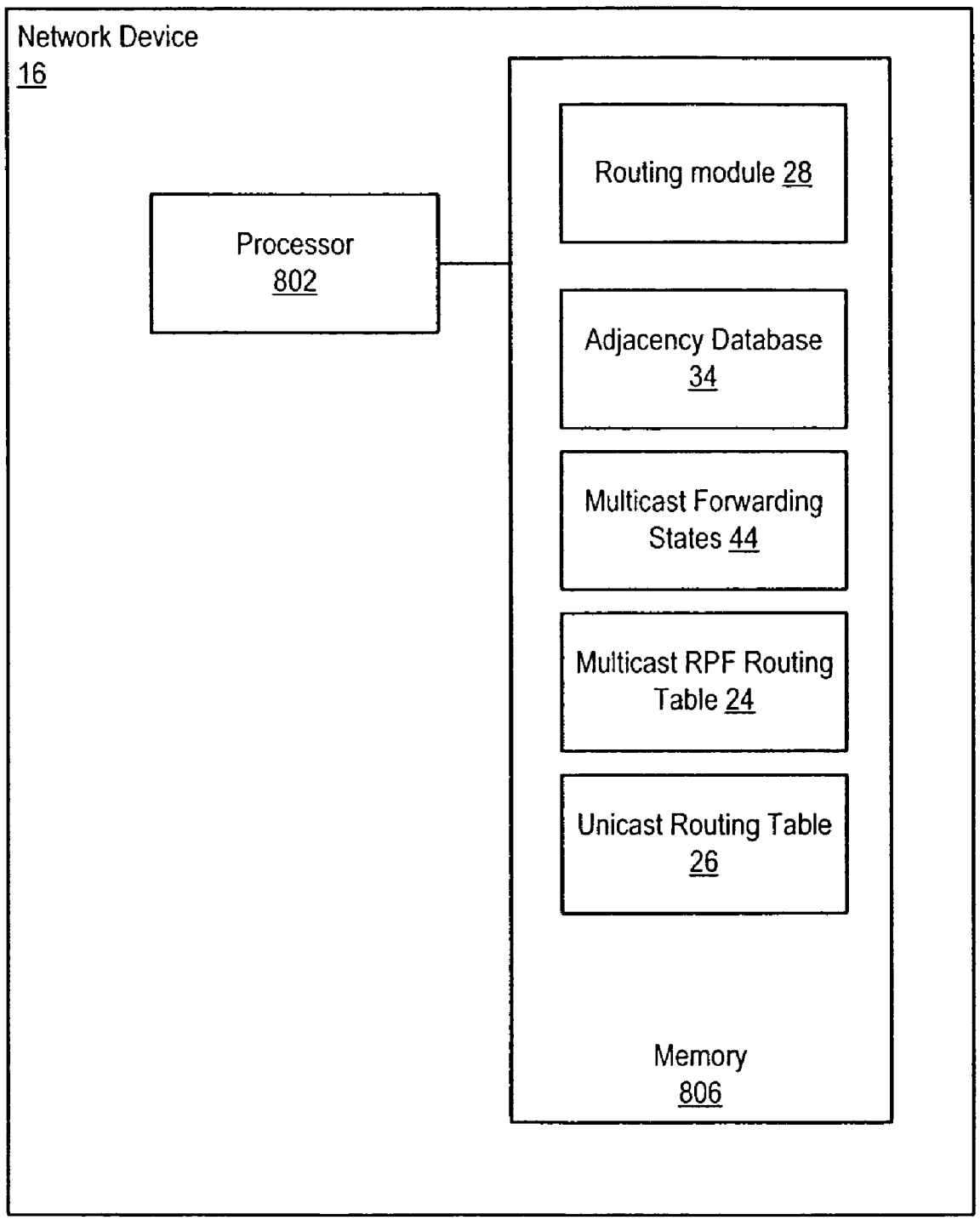
FIG. 10 is another block diagram of a network device, according to one embodiment of the present invention.

FIG. 10 illustrates a block diagram of a network device 16, which illustrates how routing module 28 can be implemented in software. As illustrated, network device 16 includes one or more processors 802 (e.g., microprocessors, PLDs (Programmable Logic Devices), or ASICs (Application Specific Integrated Circuits)) configured to execute program instructions stored in memory 806. Memory 806 can include various types of RAM (Random Access Memory), ROM (Read Only Memory), Flash memory, MEMS (Micro Electro-Mechanical Systems) memory, and the like. Processor 802 and memory 806 can be included in a route processor (e.g., route processor 700 of FIG. 9). Processor 802 and memory 806 are coupled to send and receive data and control signals by a bus or other interconnect.

In this example, program instructions executable to implement routing module 28 are stored in memory 806. Additionally, information that makes up an adjacency database 34, multicast forwarding states 44, a multicast RPF routing table 24, and a unicast routing table 26 can also be stored in memory 806 for use by routing module 28. The program instructions and data implementing routing module 28 can be stored on various computer readable media such as memory 806. In some embodiments, routing module 28 software is stored on a computer readable medium such as a CD (Compact Disc), DVD (Digital Versatile Disc), hard disk, optical disk, tape device, floppy disk, and the like). In order to be executed by processor 802, the instructions and data implementing routing module 28 are loaded into memory 806 from the other computer readable medium. The instructions and/or data implementing routing module 28 can also be transferred to network device 16 for storage in memory 806 via a network such as the Internet or upon a carrier medium. In some embodiments, a computer readable medium is a carrier medium such as a network and/or a wireless link upon which signals such as electrical, electromagnetic, or digital signals, on which the data and instructions implementing routing module 28 are encoded, are conveyed.

Although the present invention has been described in connection with several embodiments, the invention is not intended to be limited to the specific forms set forth herein. On the contrary, the present invention is intended to cover such alternatives, modifications, and equivalents as can be reasonably included within the scope of the invention as defined by the appended claims.

What is claimed is:

1. A system comprising:
   a first network device comprising:
   a send-only interface configured to be coupled to a unidirectional link;
   a bidirectional interface, wherein the bidirectional interface does not comprise the send-only interface; and
   a routing module coupled to the send-only interface and to the bidirectional interface, wherein
   the routing module is configured to send a routing advertisement via the bidirectional interface,
   the routing advertisement identifies a route leading to the send-only interface,
   the routing module is configured to maintain a multicast RPF routing table entry that is associated with the unidirectional link,
   the multicast RPF routing table entry identifies that an infinite efficiency is associated with the unidirectional link,
   the routing module is configured to maintain a unicast routing table entry that corresponds to the unidirectional link, and
   the unicast routing table entry identifies that a finite efficiency is associated with the unidirectional link.

2. The system of claim 1, further comprising:
   a multicast-capable device, the multicast-capable device comprising a receive-only interface, a second bidirectional interface, and second routing module coupled to the receive-only interface and the second bidirectional interface, wherein
   the receive-only interface is configured to receive a multicast protocol control message from the first network device via the unidirectional link,
   the second routing module is configured to reply to the multicast protocol control message by sending a second multicast protocol control message via the second bidirectional interface, and
   a destination address of the second multicast protocol control message is a network address of the send-only interface.

3. A system comprising:
   a first network device comprising:
   a bidirectional interface;
   a receive-only interface configured to be coupled to a unidirectional link; and a routing module coupled to the bidirectional interface and the receive-only interface, wherein
  the bidirectional interface is configured to receive a routing advertisement, wherein the bidirectional interface does not comprise the receive-only interface,
  the routing advertisement identifies a route leading to a send-only interface coupled to the receive-only interface by the unidirectional link,
  the receive-only interface is configured to receive a multicast protocol control message,
  the routing module is configured to reply to the multicast protocol control message by sending a second multicast protocol control message via the bidirectional interface on the route identified in the routing advertisement,
  the routing module is configured to store information associated with the route identified in the routing advertisement in a unicast routing table,
  a unicast destination address of the second multicast protocol control message is a network address of the send-only interface,
  the routing module is configured to maintain a multicast RPF routing table entry that is associated with the unidirectional link,
  the multicast RPF routing table entry identifies that a finite efficiency is associated with the unidirectional link,
  the routing module is configured to maintain a unicast routing table entry that corresponds to the unidirectional link, and
  the unicast routing table entry identifies that an infinite efficiency is associated with the unidirectional link.

4. A method comprising:
detecting that an interface coupled to a unidirectional link is a send-only interface;
maintaining a multicast RPF routing table entry corresponding to the unidirectional link, wherein
  the multicast RPF routing table entry identifies that an infinite efficiency is associated with the unidirectional link;
maintaining a unicast routing table entry corresponding to the unidirectional link, wherein
  the unicast routing table entry identifies that a finite efficiency is associated with the unidirectional link; and
sending a routing advertisement via a bidirectional interface, wherein the routing advertisement identifies a route leading to the send-only interface, and wherein the bidirectional interface does not comprise the send-only interface.

5. A method comprising:
receiving a routing advertisement via a bidirectional interface, wherein the routing advertisement identifies a route leading to a send-only interface;
receiving a multicast protocol control message from the send-only interface via a receive-only interface, wherein the bidirectional interface does not comprise the receive-only interface;
storing information associated with the route identified in the routing advertisement in a unicast routing table, wherein
  a unicast destination address of the second multicast protocol control message is a network address of the send-only interface;
maintaining a multicast RPF routing table entry corresponding to a unidirectional link coupled to the receive-only interface, wherein
  the multicast RPF routing table entry identifies that a finite efficiency is associated with the unidirectional link coupled to the receive-only interface;
maintaining a unicast routing table entry corresponding to the unidirectional link, wherein
  the unicast routing table entry identifies that an infinite efficiency is associated with unidirectional link; and
replying to the multicast protocol control message, wherein the replying comprises:
  sending a second multicast protocol control message to the send-only interface via the bidirectional interface on the route identified in the routing advertisement.

6. A system comprising:
means for detecting that an interface coupled to a unidirectional link is a send-only interface;
means for maintaining a multicast RPF routing table entry corresponding to the unidirectional link, wherein
  the multicast RPF routing table entry identifies that an infinite efficiency is associated with the unidirectional link;
means for maintaining a unicast routing table entry corresponding to the unidirectional link, wherein
the unicast routing table entry identifies that a finite efficiency is associated with the unidirectional link; and
means for sending a routing advertisement via a bidirectional interface, wherein the routing advertisement identifies a route leading to the send-only interface, and wherein the bidirectional interface does not comprise the send-only interface.

7. A system comprising:
means for receiving a routing advertisement via a bidirectional interface, wherein
  the routing advertisement identifies a route leading to a send-only interface;
means for receiving a multicast protocol control message from the send-only interface via a receive-only interface;
means for storing information associated with the route identified in the routing advertisement in a unicast routing table, wherein
  a unicast destination address of the second multicast protocol control message is a network address of the send-only interface;
means for maintaining a multicast RPF routing table entry corresponding to a unidirectional link coupled to the receive-only interface, wherein
  the multicast RPF routing table entry identifies that a finite efficiency is associated with the unidirectional link coupled to the unidirectional link;
means for maintaining a unicast routing table entry corresponding to the unidirectional link, wherein
the unicast routing table entry identifies that an infinite efficiency is associated with the unidirectional link; and
means for replying to the multicast protocol control message, wherein replying to the multicast protocol control message comprises:
  sending a second multicast protocol control message to the send-only interface via the bidirectional interface on the route identified in the routing advertisement, wherein the bidirectional interface does not comprise the receive-only interface.

* * * * *